United States Patent [19]
Whitlock et al.

[11] Patent Number: 5,819,946
[45] Date of Patent: Oct. 13, 1998

[54] SEPARATION SYSTEM BELT CONSTRUCTION

[75] Inventors: David R. Whitlock, Belmont; James L. Racich, Framingham; Philip S. Canada, Melrose, all of Mass.

[73] Assignee: Separation Technologies, Inc., Needham, Mass.

[21] Appl. No.: 399,699

[22] Filed: Mar. 3, 1995

(Under 37 CFR 1.47)

[51] Int. Cl.$^6$ ............... B03C 7/00; C08L 23/00
[52] U.S. Cl. ............ 209/127.1; 209/128; 524/229; 425/375
[58] Field of Search ............... 209/127.1, 128; 524/86, 101, 229, 232; 425/375

[56] References Cited

U.S. PATENT DOCUMENTS

| | | | |
|---|---|---|---|
| 3,384,692 | 5/1968 | Galt et al. | 425/375 |
| 3,988,410 | 10/1976 | Larsen et al. | 246/176 |
| 4,298,518 | 11/1981 | Ohmura et al. | |
| 4,321,189 | 3/1982 | Ohshita et al. | 524/101 |
| 4,701,487 | 10/1987 | Hakim | 524/229 |
| 4,874,507 | 10/1989 | Whitlock | 209/127.1 X |
| 5,135,974 | 8/1992 | Moore | 524/101 |
| 5,188,873 | 2/1993 | Delannoy | 525/199 X |

OTHER PUBLICATIONS

Ausimont USA, Inc., "When Plstic Parts are Part Polymist, They're Better Parts" brochure (1985–1995).

Lonza Plastic Additive Selection Guide, brochure BP, Sep., 1994.

Plastics Compounding magazine, 17/(4), Jul./Aug. 1994, p. 22.

Synthetic Product Company, Technical data sheet on "Petrac Slip–Pure" TD–003, rev Feb. 10, 1994.

Chemie Linz production brochure on "Melamine Cyanurate additive for Plastics".

Akzo Nobel "Polymer Additives", brochure, Bulletin 94–25, 1994.

Lonza spec sheet on Acrawax C (ethylene bisstearamide), revised Mar. 1993.

du Pont Kevlar Aramid Fiber Technical Guide brochure,, p. III–1 H–46267, Dec. 1992.

du Pont Teflon Fluroadditive brochure 44662, undated (but issued between 1988 and 1994).

du Pont "Guide to processing Kevlar Aramid Fiber and pulp for friction products" brochure, p. 1 E–65333, Jun. 1984.

John E. Theberge, Jane Crosby and Marygail Hutchins "Greater Property Uniormity from Aramid–Reinforced Thermoplastics, Reprint from Machine Design, Feb. 7, 1985–Reinforceds Thermoplastics".

du Pont Zytel–Kevlar SFC Short Fibert Composite Brochure H–42527, Feb. 1994.

Hoechst Plastics Hostalen GUR brochure, p. 16 HKR 112 Feb., 1981.

RTP Corp, Winona, MN brochure "Wear Resistant Thermoplastics" (1991).

LNP Corporation, Malvern, PA, "Lubricomp Internally Lubricated Reinforced Thermoplastics and Fluoropolymer Composites," Bulletin 254–998, undated (but probably from 1985–1990).

R.J. Gruber & P.C. Julien, "Dry Toner Technology", A.S. Diamond, ed., Handbook of Imaging Materials, Marcel Dekker, 1991.

(List continued on next page.)

*Primary Examiner*—Tuan Nguyen
*Attorney, Agent, or Firm*—Wolf, Greenfield & Sacks, P.C.

[57] ABSTRACT

Improved belt for a charged particle separation system, the belt being an extruded article made from a host polymer and additive composition. The host polymer and additive are selected to yield a belt with tailored properties such as wear resistance, creep, coefficient of friction, and charging properties.

47 Claims, 1 Drawing Sheet

OTHER PUBLICATIONS

A.R. Savkoor & T.J. Rutyer, "Experimental investigation of the effect of electrical potential on adhesive friction of elastomers", Advances in Polymer Friction & Wear, ed., L–H Lee, (Polymer Science& Technology Symposium Series, vol. 5B, Plenum Press, NY, 1974.

B.J. Briscoe, C.M. Pooley and D. Tabor, in "Friction & Wear of some polymers in unlubicated sliding", Advances in Polymer Friction & Wear, ed., L–H Lee, (Polymer Science & Technology Symposium Series, vol., 5B, Plenum Press, NY, 1974.

Article in Uhlmann's Encyclopedia of Industrial Chemistry, 1985, vol. B1, pp. 9–2 to 9–26.

Barry Arkles et al., "Wear Characteristics of Fluoropolymer Composites", Liquid Nitrogen Processing Corporation.

M.O.W. Richardson "Chemical and Physical EffEcts Associaed with Polymer Tribology", Department of Materials Technology, Loughborough University of Technology, Loughborough, Leicestershire, (1973).

D.C. Evans and J.K. Lancaster "The Wear of Polymers", Treatise on Materials Science And Technology, vol. 13 (1979).

S. Bahadur and Deli Gong, "The Action in the Modification of the Tribological Behavior of Polymers, Wear", 158 (1992) pp. 41–59.

Ku/Liepinds, "Electrical Properties of Polymers", Hanser Publishers, (1978).

A.R. Blythe, "Electrical Properties of Polymers", Cambridge Solid State Science Series (1979).

L.B. Schein, ElectrophotOGraphy and Development Physics, Second Edition, Springer–Verlag vol. 14 (1988, 1992).

Lieng–Huange Lee "Polymer Wear and its Control", ACS Symposium Series 287 (1985).

Donald A. Seanor "Electrical Properties of Polymers", Academic Press, Inc. (1982).

BASF Plastic, Ultramid Nylon Resins brochure, p. 18 (1991).

Atochem Inc., Polymers Division, 'Facts about Rilsan p. 10 (1986).

Gachter and Muller, Plastics Additive Handbook, 3rd Edition, Haser, p. 632 (1990).

Dow Corning Corp., "A Guide to Dow Corning Products", p. 31 (1977).

Fig. 1

SEPARATION SYSTEM BELT CONSTRUCTION

BACKGROUND

1. Field of the Invention

The invention relates generally to an improved belt having improved wear-resistance and desired position in the triboelectric series and more specifically to the use of such a belt in a belt separator system.

2. Discussion of the Related Art

Belt separator systems (BSS) are used to separate particulate constituents of mixtures based on the triboelectric effect (i.e., the charging of particles by surface contact). The charged particles are separated in an electric field based on their respective charges. Examples of belt separator systems are disclosed in U.S. Pat. No. 4,839,032 to Whitlock and U.S. Pat. No. 4,874,507 to Whitlock which are hereby incorporated by reference.

BSS include a transport belt which assists in the separation by moving the charged particles in a direction transverse to an electric field. During this process, the belt is exposed to substantial frictional forces, and therefore, the belt should possess a high resistance to wear. In addition, because the belt may be substantially taut at times while in use, the belt should comprise a material which provides good creep resistance.

The belts which are currently used in BSS are primarily made of woven materials. However, these materials exhibit relatively poor wear resistance, resulting in comparatively short usage lifetimes. Moreover, woven materials can only be manufactured over a relatively limited range of materials formulations. Accordingly, these materials exhibit a comparatively limited range of chemical and physical properties.

It is known to produce multi-component materials by standard extrusion processes which provide a variety of chemical and physical properties. However, many of these materials have poor creep resistance and cannot be used in belts for BBS.

Therefore, it is an object of the present invention to provide an extrudable, multi-component material which may be used as a belt in a BSS system that offers an improved separation of the constituents of a material to be separated at greater economy.

SUMMARY OF THE INVENTION

In a belt separator system, the present invention comprises an extruded material as a belt. The extruded material is selected to have desired chemical and physical properties which are appropriate for use in a BSS. The belt may include an additive dispersed within the extruded material (i.e., host polymer). The term "host polymer" as used herein denotes a polymerization product incorporating repeating chemical units. Examples of host polymers include homopolymers and copolymers of monomer units such as olefins or amides. The host polymer and additive are chosen such that the overall properties of the final material are consistent with desired values. Specifically, the additive and host polymer are chosen such that the position of the belt material in the triboelectric series and the wear resistance of the belt material improve both the range and quality of separations possible using the belt separation system.

The present invention includes a new extruded material. The material comprises a host polymer and may include an additive an additive. The host polymer and additive are chosen such that the wear resistance properties and position in the triboelectric series of the material are those according to desired values.

The invention includes a new belt comprising an extruded material for use in the electrostatic separation of constituents of a material such as with a BSS. The belt comprises a host polymer and may include an additive.

DETAILED DESCRIPTION OF THE INVENTION

Belt separator systems use a triboelectrostatic process to separate the constituents of a mixture of particles. Their operation utilizes the friction charging properties of dissimilar materials which when rubbed together develop different charges. The BSS system vigorously contacts the constituents of the material to be separated and then uses the resultant strong electrostatic effects to separate the constituents (i.e., product and refuse particles) from each other based upon the respective charge of the constituents.

Figure 1:
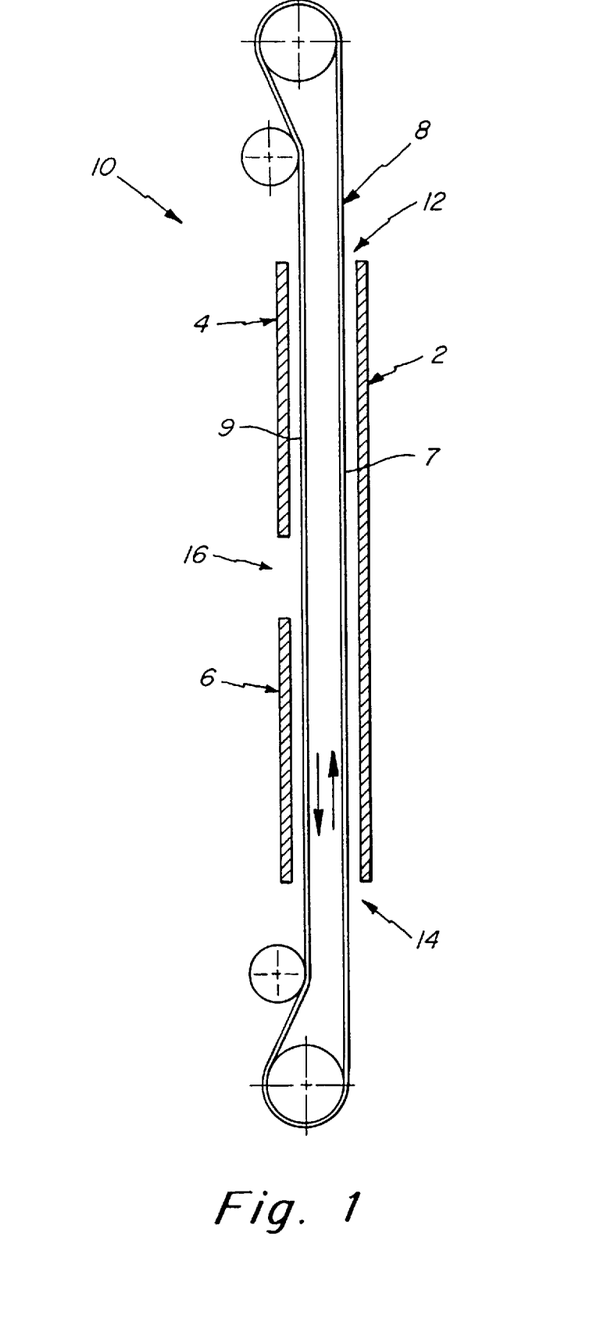
FIG. 1 is an example of a schematic illustration of a belt separating system in which a belt according to the present invention may be used.

An exemplary BSS system 10 is shown schematically in FIG. 1. Such BSS systems are known. Belt separator system 10 comprises electrodes 2, 4 and 6 which are typically flat, parallel and stationary. An electric field, exists between the electrodes and the belt. For example, as shown in FIG. 1, electrode 2 can be positively charged while electrodes 4 and 6 can be negatively charged, creating an electric field between electrode 2 and electrodes 4 and 6. Between electrodes 2, 4 and 6 are two sections 7 and 9 of an open mesh transport belt 8. Sections 7 and 9 of belt 8 move in opposite directions and transport particles, fed into feed area 16, adjacent electrodes 4 and 6 in a direction opposite to the direction of the particles adjacent to and moving along electrode 2. The motion of belt 8 agitates the particles and generates a highly turbulent, high-shear zone between electrodes 2, 4 and 6. This produces vigorous particle-to-particle contact and leads to high electrostatic charging of both belt 8 and the particles. The electric field moves the positively charged constituents toward electrodes 4 and 6 while the negatively charged constituents move toward electrode 2. The particles can move between the substantially open mesh belt 8, and, when in contact with belt 8, the particles move in opposite directions depending upon their charge. This results in a countercurrent flow of product and reject particles (i.e., particles of opposite charge). As the particles are transported, they are subjected to continued agitation, particle contact and charging. This renewed charging results in continued separation as the particles are transferred toward the product removal section 14 or the reject removal section 12 at opposite ends of BSS apparatus 10.

The sign of charge that a particle develops in a mixture determines the polarity of the electrode to which it will be attracted, and therefore, the direction in which belt 8 will carry the particle. This sign of charge is determined by the affinity for the charge of the material; that is, its work function (the energy needed to remove an electron from the surface), and the work function of the particles it contacts. The work function of a particle is also known as its Fermi energy. When two particles contact, the particle with the higher work function gains electrons and charges negatively. For example, mineral oxide particles have relatively high work functions, and coal species have relatively low work functions. Thus, during the separation of mineral oxide particles from coal using BSS system 10, the coal becomes positively charged while the mineral oxide particles become negatively charged. As a result, the coal particles are attracted to negative electrodes 4 and 6, and the mineral oxide particles are drawn toward positive electrode 2.

Referring to FIG. 1, the normal mode of operation for BSS system 10 during the separation of mineral oxide particles from coal is described. The belt moves downward on the side of the separator that has feed area 16. Adjacent electrodes 4 and 6 are kept at negative polarity. With this arrangement, the positively charged coal particles are moved downward by the belt to the product removal section 14 while the negatively charged mineral oxide particles are moved upward by the belt to the reject removal section 12.

It is also possible to operate the BSS apparatus in three other modes by varying the direction of motion of belt 8 and the polarity of electrodes 2, 4 and 6. In a second mode of operation, belt 8 moves clockwise while electrodes 2, 4 and 6 remain charged as shown in FIG. 1. A third mode of operation has electrodes 2, 4 and 6 at opposite polarity to those shown in FIG. 1 while belt 8 moves counter-clockwise, and a fourth mode of operation involves having electrodes 2, 4 and 6 charged oppositely to that shown in FIG. 1 with belt 8 moves clockwise. The mode of operation of the BSS system illustrated in FIG. 1 is referred to as negative back-down, while the second, third and fourth modes are referred to as negative back-up, positive back-down and positive back-up, respectively. A particular arrangement used in a separation depends upon the charging properties of the product and the reject particles (i.e., the sign of charge of the product and reject particles). Generally, for positively charged product particles, the negative back-down mode is preferred, while for negatively charged particles, the positive back-down mode is preferred.

Since transport belt 8 creates the countercurrent flow of particles used in achieving the separations, it must allow particles to transfer from one stream to another under the influence of the electric field. Therefore, belt 8 should minimally interfere with the particle trajectories, so it is desirable that belt 8 have a substantially open area. That is, the particles should be able to move through the belt area. Belt 8 also sweeps electrodes 2, 4 and 6 clean and provides the mechanical energy to produce particle-to-particle contact and the resulting contact charging. Therefore, to have a long life, the material comprising belt 8 should be abrasion resistant, have a high strength, and have a low coefficient of friction. In addition, since belt 8 is in contact with electrodes 2, 4 and 6, it must be made of a substantially non-conductive material to avoid shorting electrodes 4 or 6 with electrode 2 or otherwise adversely effecting the electric fields. Moreover, belt 8 should be chemically resistant to the conditions that are present while apparatus 10 is in use and should have a structure which allows relatively easy fabrication at minimal cost.

The present invention comprises an extruded belt which may have a desired position in the triboelectric series such that the overall performance and quality of BSS apparatus 10 is maximized while both good wear resistance and good creep resistance are maintained. A material's position in the triboelectric series is defined by the polarity of charge the material develops during triboelectric charging relative to other materials in the triboelectric series. The position of a material in the triboelectric series depends upon the work function of the material. A number of materials and their relative positions in the triboelectric series are listed in Table I. Based on this table, a first material may be described as being "higher" in the triboelectric series relative to a second material by which it is meant that the second material would tend to charge negatively when rubbed with the first material. Alternatively, a first material may be described as being "lower" in the triboelectric series relative to a second material by which it is meant that the second material would tend to charge positively when rubbed with the first material.

| Material | Polarity |
| --- | --- |
| melamine cyanurate, ethylene bis-stearamide | Positive |
| aminosilane | ↑ |
| nylons, silane treated talcs | ↑ |
| aramids, silane treated talcs | ↑ |
| untreated talc | ↓ |
| polyethylene | ↓ |
| micro-reinforced PTFE, fluoropolymers | ↓ |
| Polytetrafluoroethylene | Negative |

In BSS 10, the surface area of each individual particle is much smaller than the surface area of belt 8, but the surface area of belt 8 is much smaller than the combined surface area of all the particles. Therefore, the charging properties of belt 8 have a comparatively small effect on the charging of the particles from contact with belt 8. However, belt 8 can become charged through particle-belt contact, and this charge can have a substantial effect on the electric field between electrodes 2, 4 and 6. For example, if belt 8 is charged negatively during the separation of mineral oxides from coal, the positive charge on the coal particles is compensated for by the negative charge on belt 8 in product-transport region 17. This allows for higher charge levels before breakdown of the electric field. Conversely, if belt 8 is also negative in the reject transport region 14, the high level of negative charge leads to corona charging of reject particles which then contaminate the product. Accordingly, the invention provides a belt 8 including material which can have the sign of its electropolarity manipulated to fit its use in a particular separation. This requires that belt 8 be made using a process which allows the material properties of belt 8 to be varied over a broad range.

Another issue which must be considered when manufacturing belt 8 for BSS system 10 is the amount that the length of belt 8 changes while in use. During operation of BSS system 10, belt 8 may at times be substantially taut. If belt 8 stretches more than about 5% from its original length, either the belt slack take-up allowance, the quality of separation or both may be adversely affected. Ultimately, the creep resistant properties of belt 8 may limit its lifetime. Therefore, it is desirable to have a belt made of material which allows BSS system 10 to run for extended periods of time without the length of belt 8 undergoing any substantial change (i.e., belt 8 should have good creep resistance). The present invention comprises such a belt.

Heretofore, woven belts have been used in separation systems like BSS system 10. While woven textiles are often designed for mechanical applications, these belts exhibit relatively poor wear resistance in BSS applications. Accordingly, they last for comparatively short periods of time in use. Furthermore, the cost of manufacturing woven belts is relatively high, and it takes a relatively long period of time to manufacture such belts. Moreover, woven belts have a relatively limited range of material formulations which limits the charging characteristics (i.e., range within the triboelectric series) of the belts, resulting in separations of relatively poor quality. In addition, the open area provided by woven belts is less than that achievable using an extrudable belt material. In a preferred embodiment of the present invention, the belt comprises at least 40% open area. In a more preferred embodiment, the belt comprises at least 70% open area.

The present invention comprises an extruded, polymer (i.e., host polymer) that may include at least one additive. Extruded materials comprising a host polymer with or without an additive have been manufactured previously for uses other than those of the present invention, but many of these materials have not provided the chemical and physical properties of the present invention. Certain multicomponent, extruded materials disclosed in the prior art exhibit poor creep resistance. However, it is herein disclosed that, according to the present invention, certain materials formed according to a standard extrusion process provide the chemical and physical properties necessary for use as a belt in a BSS. According to the present invention, a host polymer and additive(s) are chosen so that the product is a material which demonstrates the wear resistance, creep resistance and charging characteristics desired for use as belt 8 in BSS apparatus 10. Additionally, since such a belt comprises an extrudable material, a great reduction in cost and labor associated with producing the material is achieved in comparison to woven belts.

The polymers used according to the present invention may be uniaxially oriented, biaxially oriented or non-oriented. These polymers may comprise either homopolymers or copolymers. Moreover, these polymers may be linear, branched or cross-linked. In addition, these polymers include both elastomers and plastics. The word "plastic" herein denotes a polymer which, after having undergone substantial elongation on application of stress, does not substantially return to its original shape after release of stress. By the word "elastomer" it is meant a polymer which, after having undergone substantial elongation on application of stress, substantially returns to its original shape after release of stress such as thermoplastic elastomers. Polymers according to the present invention may also comprise thermosets.

Polymers comprising the present invention preferably are low cost. In a preferred embodiment, the polymers which comprise plastics have medium to high crystallinity. By medium to high crystallinity, it is meant that the crystallinity of the polymer is at least about 10%. In another preferred embodiment, polymers according to the present invention have food contact approval according to at least one FDA regulation as given, for example, in 21 C.F.R. §§175.300, 175.320, 179.45 or 181.28. In still another preferred embodiment, the polymers exhibit extrusion processability. Extrusion processability is herein meant to denote a polymer which is suitable for commercially available equipment used in extrusion processes. In one preferred embodiment, the polymer exhibits high electrical resistivity by which it is meant that the resistivity of the polymer should be at least about $10^{10}$ Ohm-cm.

Among polymers which are found in the more electronegative part of the triboelectric series, either homopolymers or copolymers of polyolefins including, for example, high density polyethylene (HDPE), medium density polyethylene, low density polyethylene, linear low density polyethylene, polypropylene, olefin thermoplastic elastomers, and olefin flexomers may comprise the host polymer. Preferably, these polyolefins have a molecular weight of at least 12,000. In a preferred embodiment, HDPE comprises the host polymer. Polymers which may comprise the host polymer of the present invention and which are located in the more electropositive portion of the triboelectric series include either the homopolymers or copolymers of polyamides including, for example, nylon 6, nylon 6,6, nylon 11, nylon 12, and nylon 6,12. In a preferred embodiment, nylon 6 comprises the host polymer. However, while several host polymers have been listed here, it is to be appreciated that any polymer with the required chemical and physical properties listed above may comprise the host polymer of the present invention. Preferably, these polyamides have a molecular weight of at least 5,000.

If additives are used in the host polymer, they are chosen based on their physical and chemical properties. The one or more additives are preferably compatible with the host polymer by which it is meant that the dispersion of the additive within the host polymer may be tailored to suit the requirements of a given belt material. In one prefered embodiment, the one or more additives provide benefits in wear resistance. In another preferred embodiment, the one or more additives provide benefits in the charging properties. In still another preferred embodiment, the one or more additives provide benefits in creep resistance. Since the creep resistance of a material often depends upon the temperature of the material, the additive may provide benefits in creep resistance by enhancing thermal conductivity, thus decreasing the temperature at which the belt operates. In a yet another preferred embodiment, the one or more additives provide benefits in the wear resistance, creep resistance and charging properties of the belt material. The charging properties of an additive may be measured by the additive's relative position in the triboelectric series. The additive should be dispersed throughout the belt in a predictable fashion such that the wear resistance and charging properties of the belt are improved in a desired manner. For example, in one preferred embodiment of the present invention, the additive should be dispersed homogeneously throughout the host polymer to provide consistent wear resistance and charging properties to the belt over the lifetime of the belt. Alternatively, in another preferred embodiment of the present invention, the additive should preferentially segregate to the surface of the host polymer to optimally provide desired wear resistance and charging properties to the belt. Among the additives which may be used in the above-listed host polymers are fluoropolymers, ultrahigh molecular weight polyethylene, aromatic polyamids, inorganic fillers such as talc or surface-coated talc, ethylene bis-stearamide, melamine cyanurate, microreinforced fluoropolymers, and amino-containing compounds such as amino silane.

An additive is selected based on its chemical, physical and charging characteristics, and considering the chemical and physical properties of the host polymer and the separation to be performed. For example, it may be desirable to have a belt comprised of material which is rather electronegative such as explained above for the case of mineral oxide separation from coal. Therefore, HDPE may be chosen as the host polymer because it appears in the more electronegative part of the triboelectric series. A fluoropolymer, such as polytetrafluoroethylene (PTFE), may be used as a filler since it is also is found in the more electronegative portion of the triboelectric series. Moreover, PTFE itself has good wear resistance properties. Thus this PTFE filled HDPE belt comprises a material which is lower on the triboelectric series than HDPE. The material also exhibits increased wear resistance properties relative to unfilled HDPE, resulting in a longer lasting belt which provides an improved separation. Alternatively, calcium carbonate is known to have a relatively lower work function and, therefore, to take on a positive charge during frictional charging and separation on a BSS. Therefore, to separate calcium carbonate from impurities in a mixture, it may be preferable to have an electropositive belt. By using nylon 6, which is located in the more electropositive end of the triboelectric series, as the host polymer and melamine cyanurate, which also appears in the more electropositive portion of the triboelectric series, as the additive the belt comprises a material located higher on the triboelectric series than nylon 6. This results in a superior separation of calcium carbonate relative to using an unfilled nylon 6 belt. In addition, melamine cyanurate is a hard, crystalline material and imparts enhanced wear resistant properties to the belt, allowing the belt to last for a longer time while in use.

Since each additive has its own charging characteristics and wear resistance properties, by varying the additive(s) present in a host polymer, the overall wear resistance and charging properties of the belt may be varied over a wide range allowing for a broad variety of separations to be performed using a BSS apparatus with such a belt. For example, an additive may be dispersed within HDPE to create a material which is located lower or higher in the triboelectric series than unfilled HDPE depending upon whether the additive is higher or lower in the triboelectric series relative to HDPE. Alternatively, an additive may be dispersed within nylon 6 to produce a material which is higher or lower in the triboelectric series than unfilled nylon 6 depending upon whether the additive is higher or lower than nylon 6 in the triboelectric series. Furthermore, if the host polymer and the additive appear in opposite portions of the triboelectric series, the additive may be added in an amount such that the final material appears in the opposite portion of the triboelectric series relative to the host polymer. Extrudable, electropositive polymers are often more expensive than extrudable, electronegative polymers so that the present invention provides a cost effective route to electropositive belts.

Using a belt comprised of an extruded material including a host polymer and an additive, the BSS system can be used to separate the constituents of any of a broad range of mixtures. Some of the mixtures which may be separated include talc, flour, calcium carbonate, fly ash, feldspar, recycled plastic, biological macromolecules and their associated impurities. Additional details of the constituents which could be separated are disclosed in U.S. Pat. No. 4,839,032 to Whitlock and U.S. Pat. No. 4,874,507 to Whitlock. Preferred embodiments of the present invention disclosed as prophetic examples are as follows. In all embodiments of the invention, the belt may be either oriented or nonoriented and the belt can be formed by known extrusion techniques such as rotating or stationary die-based netting processes, perforation after sheet extrusion with uniaxial or biaxial orientation, and equivalent techniques depending upon the orientation of the belt material. Other such extrusion techniques which may be used to extrude the belt of the present invention include those disclosed in U.S. Pat. No. 3,384,692 to Galt. It is to be appreciated that, although some examples of extrusion techniques are given, any known extrusion technique can be used to extrude the belt of the present invention.

EXAMPLE I

Host polymer: HDPE in the form of Alathon® available from Occidental Chemical in Dallas, Tex. Alathon® is a registered trademark of Occidental Chemical, Dallas, Tex.

Additive: tetrafluoroethylene-hexafluoropropylene-vinylidene fluoride terpolymer in the form of THV® 500 fluoroplastic pellets available from 3M in St. Paul, Minn. THV® is a registered trademark of 3M, St. Paul, Minn.

When processed as a mixture and cooled from a molten state, THV® 500 fluoroplastic phase separates from HDPE and, as a result, the final material has microstructures of THV® evenly dispersed throughout the host polymer. Since the compatability, melting characteristics and electronegativity of THV® depend on the relative amounts of fluorine present in the polymer, selection of different grades of THV® allows for unusual morphologies that yield a broad range of desirable wear-resistance properties. In addition, because THV® fluoroplastic is electronegative, the overall electronegativity of the final material is larger in magnitude than that of HDPE alone. Preferably the THV® comprises about 1% to about 30% of the final material by weight, more preferably from about 2% to about 20% of the final material by weight, and most preferably from about 5% to about 15% of the final material by weight. In one preferred embodiment, the grade of THV® used partially or totally melts at the extrusion temperatures used for HDPE allowing uniform dispersion of the THV® in the HDPE melt prior to crystallization. This facilitates the controlled micro-dispersion of the THV® in the final product, once cooled.

EXAMPLE II

Host Polymer: HDPE in the form of Alathon® available from Occidental Chemical in Dallas, Tex. Alathon® is a registered trademark of Occidental Chemical, Dallas, Tex.

Additive: Ultra high molecular weight polyethylene (UHMWPE) powder available from Hoechst (Celanese) Hostalen® GUR in Houston, Tex.

UHMWPE is an electronegative material, and, therefore, when added to HDPE, the final material has similar electronegativity to unfilled HDPE. UHMWPE is added to HDPE either as a fluffy powder or in the form of beads. When UHMWPE in the form of a fluffy powder is added to HDPE, the final material comprises a compatible multicomponent material of UHMWPE dispersed throughout HDPE. When UHMWPE is added to HDPE in the form of beads, the final material has the beads of UHMWPE evenly dispersed throughout the HDPE. Such beads of UHMWPE may be created by putting UHMWPE powder into a high surface tension liquid matrix at elevated temperature where UHMWPE is immiscible with the liquid. Under these conditions, the interfacial tension of the UHMWPE/liquid interface causes UHMWPE beads to form. These beads of UHMWPE when subsequently used as an additive, may evenly disperse throughout the HDPE and result in a final material with wear resistance which is located in the electronegative portion of the triboelectric series. In either form, UHMWPE is preferably from about 1% to about 30% of the final material by weight, more preferably from about 5% to about 25% of the final material by weight, and most preferably from about 10% to about 20% of the final material by weight.

EXAMPLE III

Host polymer: HDPE in the form of Alathon® available from Occidental Chemical in Dallas, Tex. Alathon® is a registered trademark of Occidental Chemical, Dallas, Tex.

Additive: Aromatic polyaramid in the form of 1.5 mm Kevlar® flock available from du Pont Chemical in Wilmington, Del. Kevlar® is a registered trademark of du Pont Chemical of Wilmington, Del.

Since it is a polyamide, Kevlar® appears in the electropositive end of the triboelectric series. Thus, by adding the Kevlar® to the HDPE, the final material has charging characteristics which place it higher in the triboelectric series than unfilled HDPE. In addition, Kevlar® greatly increases the chemical inertness, strength and creep resistance of the final material at elevated temperatures. Moreover, it imparts very good wear resistance properties to the final material. Preferably Kevlar® comprises about 1% to about 25% of the final material by weight, more preferably from about 5% to about 25% of the final material by weight, and most preferably from about 10% to about 20% of the final material by weight.

EXAMPLE IV

Host polymer: HDPE in the form of Alathon® available from Occidental Chemical in Dallas, Tex. Alathon® is a registered trademark of Occidental Chemical, Dallas, Tex.

Additive: Surface pre-treated talc in the form of Microtuff F® available from Specialty Minerals in New York, N.Y. Microtuff F® is a registered trademark of Specialty Minerals in New York, N.Y.

Microtuff F® is hard, slippery, lubricious, has a high surface to volume ratio, and is designed for extruded materials. Therefore, this additive increases the stiffness, strength and overall wear resistance properties of the final material. In addition, the Microtuff F® improves creep-resistance properties of the final material. Moreover, because Microtuff F® is an inorganic filler, the thermal conductivity of the overall material is greater than that of unfilled HDPE. Preferably, Microtuff F® comprises from about 1% to about 50% of the final material by weight, more preferably from about 10% to about 40% of the final material by weight, and most preferably from about 15% to about 35% of the final material by weight.

EXAMPLE V

Host polymer: HDPE in the form of Alathon® available from Occidental Chemical in Dallas, Tex. Alathon® is a registered trademark of Occidental Chemical, Dallas, Tex.

Filler: PTFE in the form of grade MP 1600 Teflon) powder available from du Pont Chemical in Wilmington, Del. Teflon® is a registered trademark of du Pont Chemical, Wilmington, Del.

Because HDPE and Teflon® are both located in the negative end of the triboelectric series, using Teflon® as an additive in HDPE produces a material which is similarly located in the triboelectric series as unfilled HDPE. In addition, unlike most polymers, Teflon® exhibits low cohesive strength and coats mating surfaces during sliding wear processes, resulting in low coefficients of friction. Thus, the wear-resistance properties of the final material are increased by using Teflon® as a filler. Preferably, Teflon® comprises from about 1% to about 30% of the final material by weight, more preferably from about 5% to about 20% of the final material by weight, and most preferably from about 10% to about 20% of the final material by weight.

EXAMPLE VI

Host polymer: HDPE in the form of Alathon® available from Occidental Chemical in Dallas, Tex. Alathon® is a registered trademark of Occidental Chemical, Dallas, Tex.

Additive Ethylene bis-stearamide in the form of Acrawax C® available from Lonza in Fair Lawn, N.J. Acrawax C® is a registered trademark of Lonza, Fair Lawn, N.J.

As an amide, Acrawax C® is located in the electropositive end of the triboelectric series, and when it is used as an additive in HDPE in a sufficient amount, the final material appears higher in the triboelectric series than unfilled HDPE. In addition, Acrawax C® is inexpensive, non-colored, low in toxicity, low in hygroscopicity, in polyolefins, relatively less migratory or slower migrating than other commonly used amide-type anti-static and internal lubricating agents. Acrawax C® may be processed to be evenly dispersed in the HDPE, minimizing the surface blooming of the additive and maintaining surface charging characteristics for an extended period of use. Preferably, Acrawax C® comprises from 0.05% to about 10% of the final material by weight, more preferably from about 0.08% to about 8% of the final material by weight, and most preferably from about 0.1% to about 3% of the final material by weight.

EXAMPLE VII

Host polymer: Nylon 6 in the form of Ultramid® available from BASF in Parsippany, N.J. Ultramid® is a registered trademark of BASF, Parsippany, N.J.

Additive: PTFE in the form of grade MP 1600 Teflon® available form du Pont Chemical in Wilmington, Del. Teflon® is a registered trademark of du Pont Chemical, Wilmington, Del.

Nylon 6 is located in the electropositive portion of the triboelectric series, while Teflon® appears in the electronegative part of the triboelectric series. Therefore, using Teflon® in an additive to Nylon 6 produces a material which appears lower in the triboelectric series than unfilled Nylon 6. In addition, Teflon® increases the wear resistance properties of the final material. Preferably, Teflon® comprises from about 1% to about 30% of the final material by weight, more preferably from about 5% to about 20% of the final material by weight, and most preferably from about 10% to about 20% of the final material by weight.

EXAMPLE VIII

Host Polymer: Nylon 6 in the form of Ultramid® available from BASF in Parsippany, N.J. Ultramid® is a registered trademark of BASF, Parsippany, N.J.

Additive: 1.5 mm Kevlar® flock available from duPont Chemical in Wilmington, Del. Kevlar® is a registered trademark of du Pont Chemical of Wilmington, Del.

Using Kevlar® as an additive will greatly increases the chemical inertness of the final material at elevated temperatures. In addition, Kevlar® greatly increases the chemical inertness, strength and creep resistance of the final material at elevated temperatures. Because Kevlar® is located in the electropositive portion of the triboelectric series, using it as an additive in nylon 6 produces a final material which appears higher in the triboelectric series than unfilled nylon 6N Preferably Kevlar® comprises from about 1% to about 25% of the final material by weight, more preferably from about 5% to about 25% of the final material by weight, and most preferably from about 10% to about 20% of the final material by weight.

EXAMPLE IX

Host Polymer: Nylon 6 in the form of Ultramid® available from BASF in Parsippany, N.J. Ultramid® is a registered trademark of BASF, Parsippany, N.J.

Additive: Ethylene bis-stearamide (EBS) in the form of Acrawax C® available from Lonza in Fair Lawn, N.J. Acrawax C® is a registered trademark of Lonza, Fair Lawn, N.J.

Acrawax C® appears in the electropositive portion of the triboelectric series, and used as an additive in nylon 6, produces a final material which is located higher in the triboelectric series than unfilled nylon 6. Moreover, Acrawax C® is inexpensive, non-colored, low in toxicity, low in hygroscopicity and non-migratory or slowly migratory in polyamides. Acrawax C® can form an even dispersion throughout the host material, and, because EBS is a slippery material, the wear resistance properties of the final material are increased. Preferably, Acrawax C® comprises from 0.05% to about 10% of the final material by weight, more preferably from about 0.08% to about 8% of the final material by weight, and most preferably from about 0.1% to about 3% of the final material by weight.

EXAMPLE X

Host Polymer: Nylon 6 in the form of Ultramid® available from BASF in Parsippany, N.J. Ultramid® is a registered trademark of BASF, Parsippany, N.J.

Additive: Melamine cyanurate available from Chemie Linz, Ridgefield Park, N.J.

Melamine cyanurate is an amino rich compound which is high temperature stable, commercially available as a micronized powder suitable for compounding, and less strongly toxic than other melamine derivatives. It is less hydroscopic and water soluble than other highly amino functional melamine compounds. It is also a hard crystalline material, and, therefore, when used as an additive in nylon 6, the wear-resistance properties of the final material are increased. Melamine cyanurate is located in the electropositive part of the triboelectric series, so, when used as an additive to nylon plastics or elastomers, the final material is located higher in the triboelectric series than unfilled nylon 6. Preferable, melamine cyanurate comprises from about 1% to about 30% of the final material by weight, more preferably from about 5% to about 25% of the final material by weight, and most preferably from about 10% to about 25% of the final material by weight.

EXAMPLE XI

Host polymer: HDPE in the form of Alathon® available from Occidental Chemical in Dallas, Tex. Alathon® is a registered trademark of Occidental Chemical, Dallas, Tex.

Additive: microreinforced PTFE in the form of size B, class E glass milled fiber from Owens Corning Fiberglas in Toledo, Ohio dispersed in grade MP 1600 Teflon powder available from duPont in Wilmington, Del.

Micro-reinforced PTFE is used as a wear-reduction additive in HDPE to yield an evenly dispersed additive in the HDPE. The mechanical reinforcement of the dispersed wear-reducing additive dramatically increases the wear resistance of the final material by increasing the life time of the additive in the host polymer. In one preferred embodiment, the micro-reinforced PTFE comprises grade MP1600 Teflon from duPont which is compounded with size B, class E glass milled fiber. Preferably, the micro-reinforced Teflon comprises from about 1% to about 30% of the final material by weight, more preferably from about 10% to about 25% of the final material by weight, and most preferably from about 10% to about 20% of the final material by weight.

EXAMPLE XII

Host Polymer: Nylon 6 in the form of Ultramid® available from BASF in Parsippany, N.J. Ultramids is a registered trademark of BASF, Parsippany, N.J.

Additive: microreinforced PTFE in the form of size B, class E glass milled fiber from Owens Corning Fiberglas in Toledo, Ohio dispersed in grade MP 1600 Teflon powder available from duPont in Wilmington, Del.

Micro-reinforced PTFE is used as a wear-reduction additive in nylon 6 to yield an evenly dispersed additive in the nylon 6. The mechanical reinforcement of the dispersed wear-reducing additive dramatically increases the wear resistance of the final material. In one preferred embodiment, the microreinforced PTFE comprises grade MP1600 Teflon which is compounded with size B, class E glass milled fiber. Preferably the microreinforced PTFE comprises from about 1% to about 30% of the final material by weight, more preferably from about 10% to about 25% of the final material by weight, and most preferably from about 10% to about 20% of the final material by weight.

EXAMPLE XIII

Host polymer: HDPE in the form of Alathon® available from Occidental Chemical in Dallas, Tex. Alathon® is a registered trademark of Occidental Chemical, Dallas, Tex.

Additive: Amino silane coupling agent in the form of Z-6020® available from Dow Corning in Midland, Mich. Z-6020® is a registered trademark of Dow Corning, Midland, Mich.

The additive is a low molecular weight amino-containing additive with low surface blooming so as to avoid a decrease in the separating characteristics of the belt as it wears. Z-60200 is located at the electropositive end of the triboelectric series, and, therefore, when used as an additive with HDPE, the locattion of the final material in the triboelectric series is higher than that of unfilled HDPE. Preferably, the additive comprises from about 0.05% to about 10% of the final material by weight, more preferably from about 0.08% to about 2% of the final material by weight and most preferably from about 0.1% to about 0.5% of the final material by weight.

EXAMPLE XIV

Host polymer: HDPE in the form of Alathon® available from Occidental Chemical in Dallas, Tex. Alathon® is a registered trademark of Occidental Chemical, Dallas, Tex.

HDPE is a relatively electronegative material as shown by its position on triboelectric series. The HDPE selected for use in this embodiment of the present invention should have a coefficient of friction of less than 0.4, a tensile modulus between 100,000 and 1,000,000 p.s.i., a tensile strength of at least 2,500 p.s.i. and a limiting PV wear resistance value of at least 1,000 p.s.i.-ft./min. Moreover, the HDPE should have creep by at most 5% after 10 hours at 1,000 p.s.i. at room temperature and a melt index of at most ten, preferably 0.1 to 5. HDPE is acid, solvent and alkali resistant. It is also moisture insensitive. Moreover, HDPE is wear resistant, has a low coefficient of friction and is readily extruded into netting. It is lubricious, slippery and strong. HDPE may be formed into an extruded netting or a perforated sheet with or without orientation.

EXAMPLE XV

Host Polymer: Nylon 6 in the form of Ultramid® available from BASF in Parsippany, N.J. Ultramid® is a registered trademark of BASF, Parsippany, N.J.

Nylon 6 is an inherently electropositive material as shown by its position in the triboelectric series. The Nylon 6 used according to this embodiment of the present invention should have a coefficient of friction of at most 0.5, a tensile modulus between 100,000 and 1,000,000 p.s.i., a tensile strength of at least 2,500 p.s.i. and a limiting PV wear resistance value of at least 1,000 p.s.i.-ft./min. In addition, the Nylon 6 should not creep more than 5% after 10 hours at 1,000 p.s.i. at room temperature Nylon 6 is solvent resistant. It has high strength above ambient high temperatures.

Having thus described several preferred embodiments of the invention, various alterations, modifications and improvements will be apparent to those skilled in the art. Such alterations, modifications and improvements as intended to be part of this disclosure, and are intended to be within the spirit and scope of the invention. Accordingly, the foregoing description is by way of example only, and not intended as limiting. The invention is limited only as defined in the following claims and equivalents thereto.

What is claimed is:

1. In a belt separator system used to separate constituents of a mixture of particles based on charging of the particles by surface contact, the system including a transport belt which moves the charged particles in a direction transverse to an electric field, the belt being exposed to substantial frictional forces during contact charging of the particles and becoming substantially taut at times while in use, the improvement comprising providing the belt as an extruded article of a host polymer and additive composition, wherein the host polymer and additive are each selected to improve one or more of the charging properties of the belt, the wear resistance of the belt, the coefficient of friction of the belt and the creep resistance of the belt.

2. The apparatus according to claim 1, wherein the host polymer and additive composition of the belt has a position in a triboelectric series which is lower than a position of the host polymer in the triboelectric series.

3. The apparatus according to claim 1, wherein the host polymer and additive composition of the belt has a position in a triboelectric series which is higher than a position of the host polymer in the triboelectric series.

4. The apparatus according to claim 2,
wherein the host polymer comprises a polymerization product of at least one olefin monomer.

5. The apparatus according to claim 2,
wherein the additive is selected from the group consisting of fluoropolymers, ultra high molecular weight polyethylene, micro-reinforced fluoropolymers, and mixtures thereof.

6. The apparatus according to claim 4, wherein the additive is selected from the group consisting of fluoropolymers, ultra high molecular weight polyethylene, micro-reinforced fluoropolymers, and mixtures thereof.

7. The apparatus according to claim 2, wherein the host polymer comprises a polymerization product having at least one amide linkage.

8. The apparatus according to claim 3,
wherein the additive is selected from the group consisting of melamine cyanurate, amino containing compounds, and mixtures thereof.

9. The apparatus according to claim 7,
wherein the additive is selected from the group consisting of melamine cyanurate, amino containing compounds, and mixtures thereof.

10. The apparatus according to claim 3,
wherein the host polymer comprises a polymerization product of at least one olefin monomer.

11. The apparatus according to claim 3,
wherein the additive is selected from the group consisting of aramid fibers, amino silanes, nonsurface pre-treated talcs, surface pre-treated talcs, ethylene bis-stearamide and mixtures thereof.

12. The apparatus according to claim 10, wherein the additive is selected from the group consisting of aramid fibers, amino silanes, nonsurface pre-treated talcs, surface pre-treated talcs, ethylene bis-stearamide and mixtures thereof.

13. The apparatus according to claim 3, wherein the host polymer comprises a polymerization product having at least one amide linkage.

14. The apparatus according to claim 3,
wherein the additive is selected from the group consisting of aramid fibers, ethylene bis-stearamide and mixtures thereof.

15. The apparatus according to claim 13,
wherein the additive is selected from the group consisting of aramid fibers, ethylene bis-stearamide and mixtures thereof.

16. The apparatus according to claim 4, wherein the host polymer is selected from the group consisting of linear low density polyethylene homopolymers, low density polyethylene homopolymers, olefin thermoplastic elastomers, olefin flexomers, ultrahigh molecular weight polyethylene homopolymers, high density polyethylene homopolymers, medium density polyethylene homopolymers, polypropylene homopolymers, linear low density polyethylene copolymers, low density polyethylene copolymers, high density polyethylene copolymers, medium density polyethylene copolymers, polypropylene copolymers, and mixtures thereof.

17. The apparatus according to claim 6, wherein the host polymer is selected from the group consisting of linear low density polyethylene homopolymers, low density polyethylene homopolymers, olefin thermoplastic elastomers, olefin flexomers, ultrahigh molecular weight polyethylene homopolymers, high density polyethylene homopolymers, medium density polyethylene homopolymers, polypropylene homopolymers, linear low density polyethylene copolymers, low density polyethylene copolymers, ultrahigh molecular weight polyethylene copolymers, high density polyethylene copolymers, medium density polyethylene copolymers, polypropylene copolymers, and mixtures thereof.

18. The apparatus according to claim 7, wherein the host polymer is selected from the group consisting of nylon 6 homopolymers, nylon 6,6 homopolymers, nylon 11 homopolymers, nylon 12 homopolymers, nylon 6,12 homopolymers, nylon 6 copolymers, nylon 6,6 copolymers, nylon 11 copolymers, nylon 12 copolymers, nylon 6,12 copolymers, and mixtures thereof.

19. The apparatus according to claim 9, wherein the host polymer is selected from the group consisting of nylon 6 hompolymers, nylon 6,6 homopolymers, nylon 11 homopolymers, nylon 12 homopolymers, nylon 6,12 homopolymers, nylon 6 copolymers, nylon 6,6 copolymers, nylon 11 copolymers, nylon 12 copolymers, nylon 6,12 copolymers, and mixtures thereof.

20. The apparatus according to claim 2, wherein the host polymer comprises HDPE and the additive comprises PTFE in an amount from about 1% to about 30% of the belt by weight.

21. The apparatus according to claim 2, wherein the host polymer comprises HDPE and the additive comprises UHMWPE in an amount from about 1% to about 30% of the belt by weight.

22. The apparatus according to claim 2, wherein the host polymer comprises HDPE and the additive comprises micro-reinforced PTFE in an amount from about 1% to about 30% of the belt by weight.

23. The apparatus according to claim 10, wherein the host polymer comprises HDPE and the additive comprises an aramid fiber in an amount from about 1% to about 25% of the belt by weight.

24. The apparatus according to claim 10, wherein the host polymer comprises HDPE and the additive comprises an surface pre-treated talc in an amount from about 1% to about 50% of the belt by weight.

25. The apparatus according to claim 10, wherein the host polymer comprises HDPE and the additive comprises ethylene bis-stearamide in an amount from about 0.05% to about 10% of the belt by weight.

26. The apparatus according to claim 10, wherein the host polymer comprises HDPE and the additive comprises an amino silane in an amount from about 0.05% to about 10% of the belt by weight.

27. The apparatus according to claim 2, wherein the host polymer comprises Nylon 6 and the additive comprises melamine cyanurate in an amount from about 1% to about 30% of the belt by weight.

28. The apparatus according to claim 2, wherein the host polymer comprises Nylon 6 and the additive comprises an amino containing compound in an amount from about 1% to about 30% of the belt by weight.

29. The apparatus according to claim 13, wherein the host polymer comprises Nylon 6 and the additive comprises an aramid fiber in an amount from about 1% to about 25% of the belt by weight.

30. The apparatus according to claim 13, wherein the host polymer comprises Nylon 6 and the additive comprises ethylene bis-stearamide in an amount from about 0.05% to about 10% of the belt by weight.

31. The apparatus according to claim 13, wherein the host polymer comprises Nylon 6 and the additive comprises PTFE in an amount from about 1% to about 30% of the belt by weight.

32. The apparatus according to claim 13, wherein the host polymer comprises Nylon 6 and the additive comprises micro-reinforced PTFE in an amount from about 1% to about 30% of the belt by weight.

33. The system of claim 1, wherein the belt travels between electrodes which establish the electric field, and the belt sweeps the electrodes to produce the particle-to-particle contact and resulting contact charging.

34. The system of claim 33, wherein the belt is a substantially non-conductive extruded article.

35. The system of claim 33, wherein the belt has a surface area which is much smaller than the combined surface area of the particles on the belt, such that the belt becomes charged through particle-belt contact and this charge has a substantial effect on the electric field between the electrodes.

36. The system of claim 1, wherein the belt has improved creep resistance such that the belt will not stretch more than about 5% from its original length.

37. The system of claim 1, wherein the belt has an increase in open area, the open area comprising at least 40%.

38. The system of claim 37; wherein the open area comprises at least 70%.

39. The system of claim 1, wherein the additive is dispersed homogeneously throughout the extruded article to provide consistent wear resistance and charging properties to the belt over the lifetime of the belt.

40. The system of claim 1, wherein the additive is segregated at a surface of the extruded article to provide desired wear-resistance and charging properties to the belt.

41. A separation apparatus including a belt arranged to transport a mixture of particles through an electric field between oppositely charged electrodes to cause the particles to undergo particle-particle collisions and particle-belt collisions such that the particles become electrically charged to effect the separation of constituents of the mixture, wherein the belt is an extruded article of a host polymer and an additive composition, the additive being dispersed within the host polymer so that the composition has a desired position in a triboelectric series and wherein the belt is held substantially taut and sweeps the electrodes during contact charging of the particles.

42. The apparatus according to claim 41, wherein the host polymer and additive composition of the belt has a position in the triboelectric series which is lower than a position of the host polymer in the triboelectric series.

43. The apparatus according to claim 41, wherein the host polymer and additive composition of the belt has a position in the triboelectric series which is higher than a position of the host polymer in the triboelectric series.

44. A belt having a position in a triboelectric series and used in the electrostatic separation of constituents of a mixture, the belt comprising:
an extruded material including a host polymer having a position in the triboelectric series and an additive having a position in the triboelectric series, the additive being dispersed within the host polymer so that the belt has a desired position in the triboelectric series.

45. The apparatus according to claim 44, wherein the additive is dispersed within the host polymer such that the position of the belt in the triboelectric series is lower than the position of the of the host polymer in the triboelectric series.

46. The apparatus according to claim 44, wherein the additive is dispersed within the host polymer such that the position of the belt in the triboelectric series is higher than the position of the of the host polymer in the triboelectric series.

47. A method of separating constituents of a mixture of particles based on charging of the particles by surface contact, including moving the charged particles on a transport belt in a direction transverse to an electric field, the electric field being established by electrodes between which the belt carrying the particles is moved, wherein the motion of the belt agitates the particles and generates a high-shear zone between the electrodes to produce vigorous particle-to-particle contact and leads to electrostatic charging of both the belt and the particles, wherein the separating of the particles is influenced by the charging characteristics of the belt, the belt being an extruded article formed of a host polymer and an additive composition, the host polymer and additive being selected to determine one or more of the charging properties of the belt, the wear-resistance of the belt, and the creep resistance of the belt.

* * * * *